(12) United States Patent
Lin (10) Patent No.: US 9,356,507 B2
(45) Date of Patent: May 31, 2016

(54) CHARGE PUMP THAT ALLOWS CHANGE OF OUTPUT VOLTAGE BY CHANGING THE WIRING

(71) Applicant: eGalax_eMPIA Technology Inc., Taipei (TW)

(72) Inventor: Po-Chuan Lin, Taipei (TW)

(73) Assignee: eGalax eMPIA Technology Inc., Taipei (TW)

( * ) Notice: Subject to any disclaimer, the term of this patent is extended or adjusted under 35 U.S.C. 154(b) by 0 days.

(21) Appl. No.: 14/585,659

(22) Filed: Dec. 30, 2014

(65) Prior Publication Data

US 2015/0188419 A1 Jul. 2, 2015

(30) Foreign Application Priority Data

Dec. 31, 2013 (TW) .............................. 102149337 A (51) Int. Cl.
 *G05F 1/10* (2006.01)
 *G05F 3/02* (2006.01)
 *H02M 3/07* (2006.01)
(52) U.S. Cl.
 CPC ..................................... *H02M 3/073* (2013.01)
(58) Field of Classification Search
 CPC ........ H02M 3/073; H02M 3/07; G11C 5/145; G11C 16/30; G05F 3/205
 USPC ................................................... 327/534–536
 See application file for complete search history.

(56) References Cited

U.S. PATENT DOCUMENTS

| 5,831,469 A * | 11/1998 | Menichelli | ............. | G11C 5/145 |
| | | | | 307/110 |
| 2013/0207716 A1* | 8/2013 | Lee | ........................... | G05F 3/02 |
| | | | | 327/536 |

* cited by examiner

*Primary Examiner* — Diana J Cheng
(74) *Attorney, Agent, or Firm* — Muncy, Geissler, Olds & Lowe, P.C.

(57) ABSTRACT

A charge pump includes a chip and a package substrate packaged on the chip and installed in a circuit board. One of the $1^{st}$~$(X-Y)^{th}$ external pins of the package substrate is electrically connected to the $(X-Y)^{th}$ input pin of the chip, and the other end of the same external pin is electrically connected to the input voltage of the circuit board. Thus, when the input voltage is being boosted through each capacitor of the circuit board, it is free from the action of the $1^{st}$ through $(X-Y-1)^{th}$ transistors of the chip and therefore the original design of the $1^{st}$ through $(X-Y-1)^{th}$ transistors can be maintained without causing any change in the output voltage Thus, the invention eliminates the problem of the prior art design that needs to change the internal circuit design when a different output voltage is required.

8 Claims, 8 Drawing Sheets

CHARGE PUMP THAT ALLOWS CHANGE OF OUTPUT VOLTAGE BY CHANGING THE WIRING

This application claims the priority benefit of Taiwan patent application number 102149337, filed on Dec. 31, 2013.

BACKGROUND OF THE INVENTION

1. Field of the Invention

The present invention relates to charge pump technology, and more particularly, to a charge pump that allows change of output voltage by changing the wiring.

2. Description of the Related Art

In a notebook computer, tablet computer, smart phone or any other electronic apparatus, an IC with charge pump is generally used for amplifying the input voltage to provide a high level of output voltage for the working of an internal working circuit.

Figure 7:
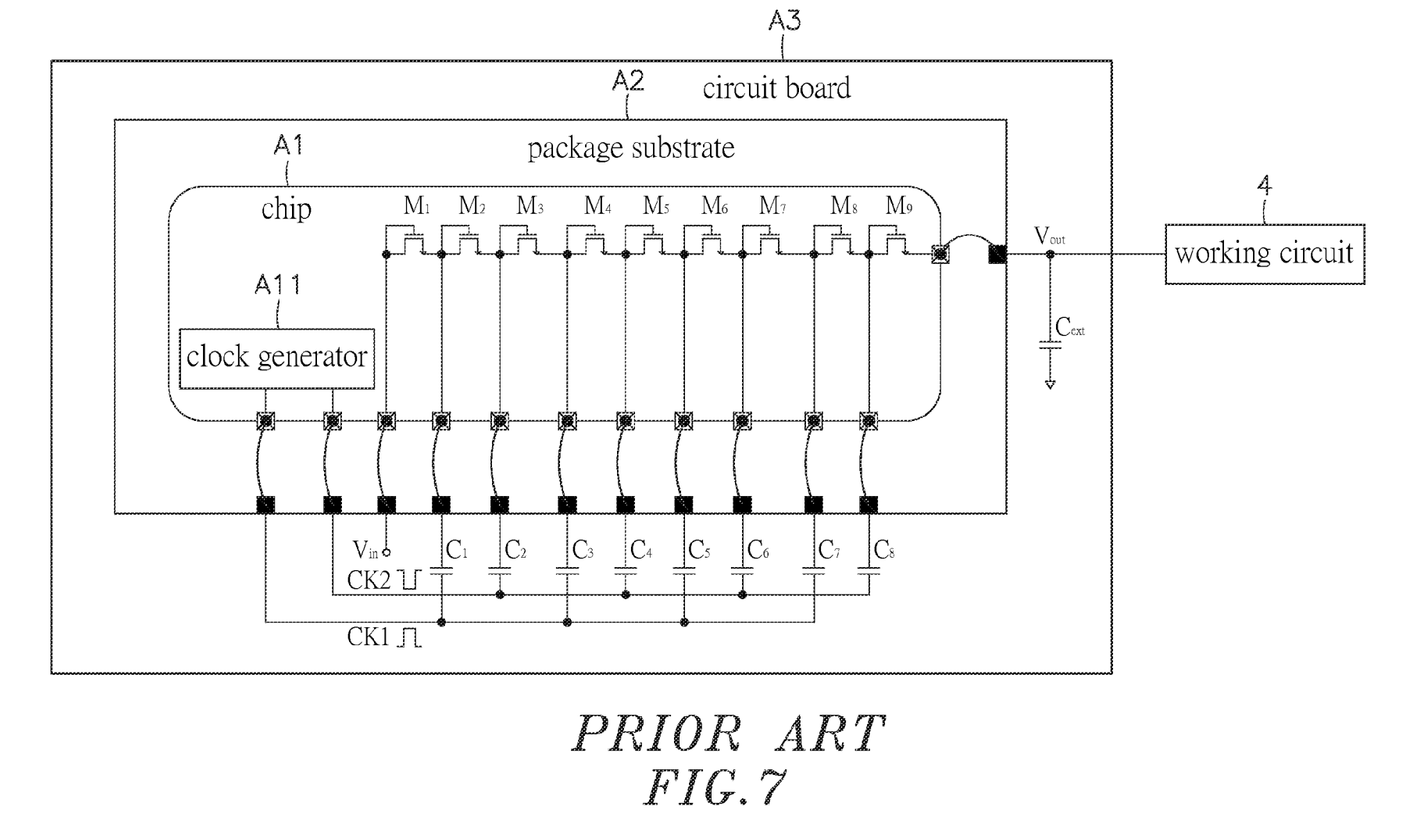
FIG. 7 is a circuit diagram of a charge pump according to the prior art (I).

FIG. 7 illustrates a charge pump according to the prior art. According to this design, the charge pump comprises a chip A1 and a package substrate A2 packaged on the chip A1. The chip A1 comprises a clock generator A11 and $1^{st}$ through $9^{th}$ transistors $M_1 \sim M_9$. The clock generator A11 is capable of generating a first clock pulse CK1 and a reversed second clock pulse CK2. When at the high voltage level, the first clock pulse CK1 and the second clock pulse CK2 have the voltage of $V_{DD}$. When at the low voltage level, the first clock pulse CK1 and the second clock pulse CK2 have zero volt. Further, the $1^{st}$ through $9^{th}$ transistors $M_1 \sim M_9$ have a threshold voltage $V_t$. The charge pump is used in a circuit board A3 that comprises an input voltage $V_{in}$ of voltage level $V_{DD}$, $1^{st}$ through $8^{th}$ capacitors $C_1 \sim C_8$, and a voltage stabilizer capacitor $C_{ext}$.

During charging period for the $1^{st}$ capacitor $C_1$, the first clock pulse CK1 and the second clock pulse CK2 are respectively at the low voltage level and the high voltage level, and therefore the even number transistors $M_2$, $M_4$, $M_6$ and $M_8$ are cut off, and the odd number transistors $M_1$, $M_3$, $M_5$, $M_7$ and $M_9$ are conducted. At this time, the $V_{DD}$ input voltage $V_{in}$ is transmitted through the $1^{st}$ transistor M1 to produce a threshold voltage $V_t$, a voltage of $V_{DD}-V_t$ is produced at one end of the $1^{st}$ capacitor $C_1$, and the other end of the $1^{st}$ capacitor $C_1$ receives zero volt from the first clock pulse CK1, and thus the $1^{st}$ capacitor $C_1$ is charged to the voltage level of $V_{DD}-V_t$.

During boosting period for the $1^{st}$ capacitor $C_1$, the first clock pulse CK1 and the second clock pulse CK2 are respectively at the high voltage level and the low voltage level, therefore the odd number transistors $M_1$, $M_3$, $M_5$, $M_7$ and $M_9$ are cut off, and the even number transistors $M_2$, $M_4$, $M_6$ and $M_8$ are conducted. At this time, one end of the $1^{st}$ capacitor $C_1$ receives the voltage of $V_{DD}$ from the first clock pulse CK1. Because the $1^{st}$ capacitor $C_1$ has stored therein voltage of $V_{DD}-V_t$, the other end of the $1^{st}$ capacitor $C_1$ has a voltage of $2V_{DD}-V_t$ that is transmitted through the $2^{nd}$ transistor $M_2$ to produce a threshold voltage $V_t$, and a voltage of $2\times(V_{DD}-V_t)$ is produced at one end of the $2^{nd}$ capacitor $C_2$, and the other end of the $2^{nd}$ capacitor $C_2$ receives the voltage of zero volt from the second clock pulse CK2, and therefore the $2^{nd}$ capacitor $C_2$ is charged to $2\times(V_{DD}-V_t)$.

Subject to the aforesaid manner, the voltages of capacitors $C_3 \sim C_8$ can be regulated, enabling the emitter of the $9^{th}$ transistor $M_9$ to provide an output voltage $V_{out}$ of $9\times(V_{DD}-V_t)$ that is then stabilized by the voltage stabilizer capacitor $C_{ext}$ and then outputted to the internal working circuit A4 of the electronic apparatus.

2

Figure 8:
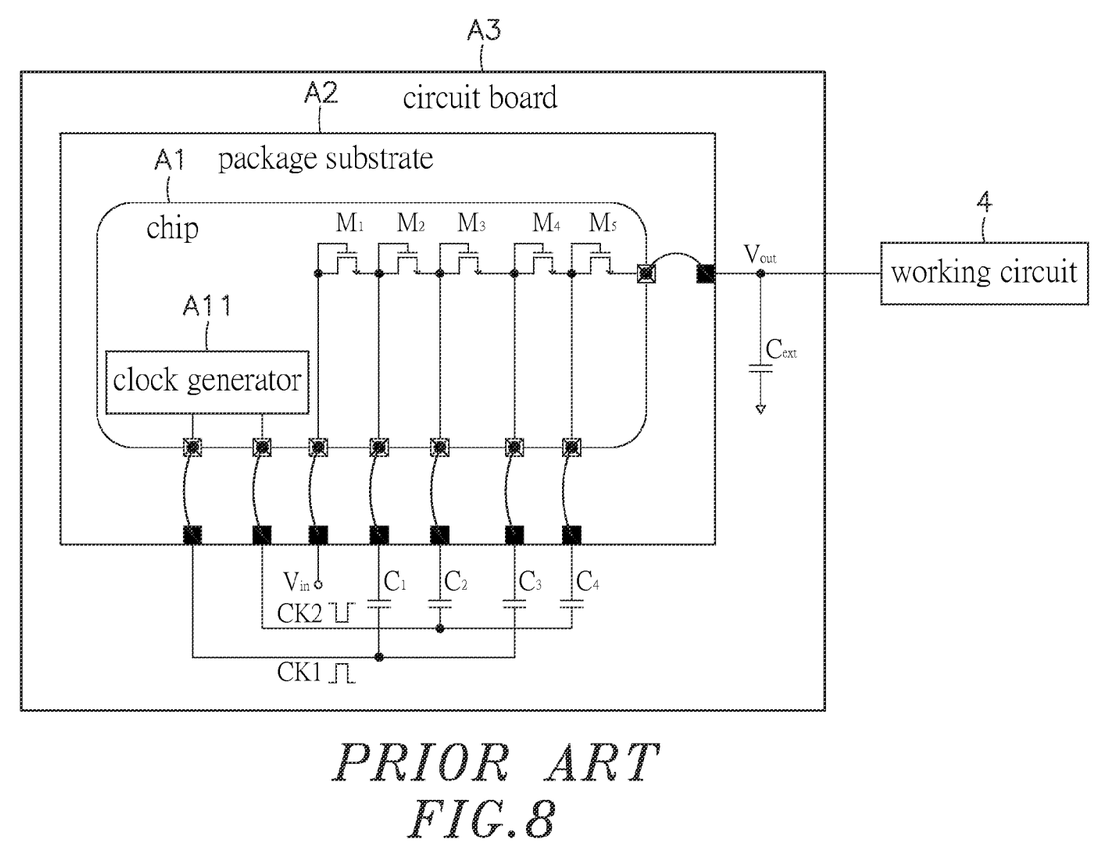
FIG. 8 is a circuit diagram of a charge pump according to the prior art (II).

However, from the circuit diagram of the prior art design shown in FIG. 8, it can be seen that if the desired working voltage for the working circuit A4 is $5\times(V_{DD}-V_t)$, the chip A1 must have $1^{st}$ through $5^{th}$ transistors $M_1 \sim M_5$ built therein to match with $1^{st}$ through $4^{th}$ capacitors $C_1 \sim C_4$ of the circuit board A3 for generating $5\times(V_{DD}-V_t)$ output voltage, i.e., a different chip A1 of a different specification must be used with the circuit board A3 for generating a different working voltage, for example, $1^{st}$ through $9^{th}$ transistors $M_1 \sim M_9$ of the chip A1 are used to match with $1^{st}$ through $8^{th}$ capacitors $C_1 \sim C_8$ of the circuit board A3 for generating $9\times(V_{DD}-V_t)$ output voltage, or $1^{st}$ through $5^{th}$ transistors $M_1 \sim M_5$ of the chip A1 are used to match with $1^{st}$ through $4^{th}$ capacitors $C_1 \sim C_4$ of the circuit board A3 for generating $5\times(V_{DD}-V_t)$ output voltage. Therefore, one specification of prior art charge pump can simply provide one output voltage $V_{out}$ for the working circuit A4 of the electronic apparatus. When intending to use the charge pump in a different electronic apparatus that requires a different working voltage, the internal circuit layout of the chip A1 and the wiring of the package substrate A2 must be relatively modified.

Further, before vending of different specifications of chips A1, these chips A1 must be verified individually through an IC verification process before acceptance. The verification must be performed on the chip A1 as well as the package substrate A2. If the circuit design of the chip A1 or the wiring between the chip A1 and the package substrate A2 is changed, a new verification must be performed. Thus, preparing multiple chips A1 of different specifications for different applications to meet different requirements for providing different output voltages requires multiple verification procedures and long operating time, increasing the cost.

Therefore, it is desirable to provide a charge pump that eliminates the drawbacks of the aforesaid prior art design.

SUMMARY OF THE INVENTION

The present invention has been accomplished under the circumstances in view. It is therefore the main object of the present invention to provide a charge pump for amplifying an input voltage to provide the desired output voltage, which allows change of the output voltage by means of changing the wiring To achieve this and other objects of the present invention, a charge pump of the invention comprises a chip and a package substrate packaged on said chip and installed in a circuit board, wherein one end of one of the $1^{st} \sim (X-Y)^{th}$ external pin of the package substrate is electrically connected to (X-Y) input terminal of the chip, and the other end of the same external pin is electrically connected to the input voltage of the circuit board, and the $(X-Y+1)^{th}$ through $X^{th}$ external pins of the package substrate are respectively electrically connected to the $1^{st} \sim Y^{th}$ capacitors. Thus, by means of electrically conducting or cutting off the $(X-Y)^{th}$ through $X^{th}$ transistors, the input voltage of the circuit board can be boosted through the $1^{st} \sim Y^{th}$ capacitors of the circuit board to provide an output voltage of $(Y+1)\times(V_{DD}-V_t)$ volts. When the input voltage is being boosted through the $1^{st}$ through $Y^{th}$ capacitors of the circuit board, it is free from the action of the $1^{st}$ through $(X-Y-1)^{th}$ transistors, and therefore the original design of the $1^{st}$ through $(X-Y-1)^{th}$ transistors can be maintained without causing any change in the output voltage. Therefore, the invention eliminates the problem of the prior art design that needs to change the internal circuit design when a different output voltage is required.

In one embodiment of the present invention, the $1^{st} \sim X^{th}$ input terminals of the chip are respectively electrically connected to the $1^{st}$~$X^{th}$ external pins of the package substrate, and the $1^{st}$~$(X-Y-1)^{th}$ external pins are maintained in a floating status, i.e., the circuit layout between the chip and the package substrate is fixed, and a different output voltage can be obtained by means of changing the circuit layout of the circuit board to match the $(X-Y)^{th}$~$X^{th}$ external pins. Therefore, for allowing the charge pump to be used in any of a variety of electronic apparatuses to match with a predetermined working circuit, the chip and the package substrate simply need to be verified once, eliminating further verification procedure and saving much the cost.

In another embodiment of the present invention, the $(X-Y)^{th}$ input terminal of the chip is electrically connected to the first external pin of the package substrate, and the first external pin is then electrically connected to the input voltage of the circuit board. Thus, the wiring of the package substrate can be changed to match the circuit layout of the circuit board for generating the desired output voltage for the working of the internal working circuit of a predetermined electronic apparatus without changing the input voltage and the circuit layout of the capacitors of the circuit board, and therefore this embodiment can provide the desired output voltage without paying any cost for the modification of the circuit layout of the circuit board.

DETAILED DESCRIPTION OF THE PREFERRED EMBODIMENT

In the following description, the terminology of "first", "second", $(X-1)^{th}$, $X^{th}$, $(Y-1)^{th}$ and $Y^{th}$ are adapted for identifying the indicated components, for example, the first transistor $M_1$, second transistor $M_2$, $(X-1)^{th}$ transistor $M_{x-1}$ and $X^{th}$ transistor $M_x$ of the transistor set 14 and the $(Y-1)^{th}$ capacitor $C_{Y-1}$ and $Y^{th}$ capacitor $C_Y$ of the capacitor set 31, but not intended to limit the scope of the present invention.

Figure 1:
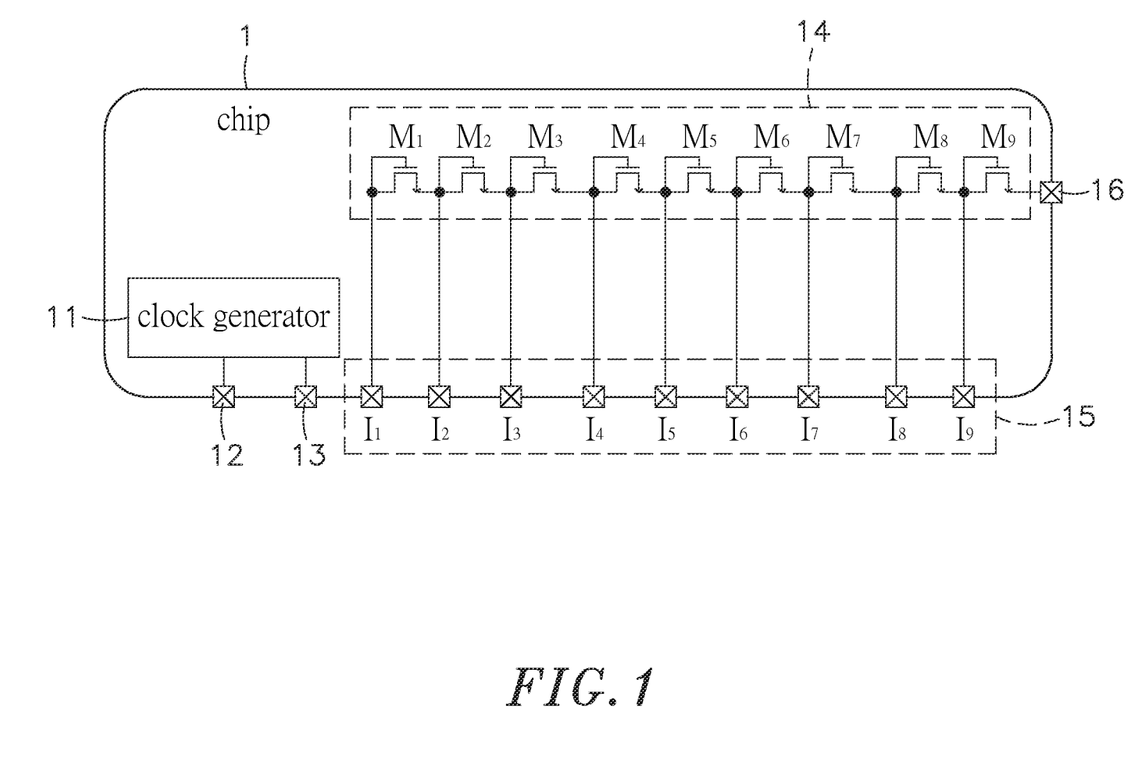
FIG. 1 is a circuit diagram of a chip for charge pump in accordance with the present invention.
Figure 2:
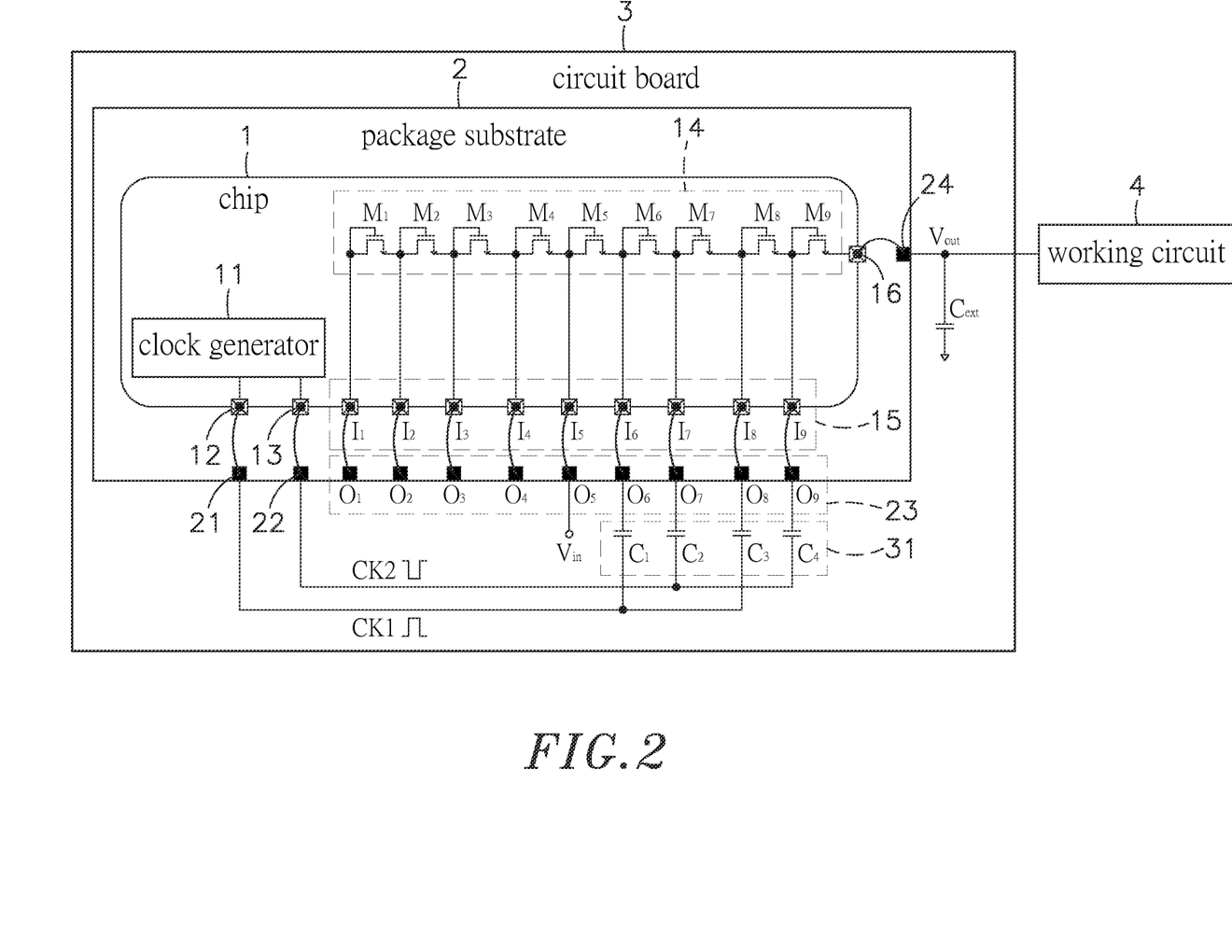
FIG. 2 is a schematic drawing illustrating an applied status of a charge pump in accordance with a first embodiment the present invention.

Referring to FIGS. 1 and 2, a charge pump in accordance with the present invention is shown. The charge pump comprises a chip 1, and a package substrate 2.

The chip 1 comprises a clock generator 11, a first clock terminal 12, a second clock terminal 13, a transistor set 14, an input terminal set 15, and an output terminal 16.

The clock generator 11 of the chip 1 is electrically coupled with the first clock terminal 12 and the second clock terminal 13, and adapted for generating a first clock pulse CK1 through the first clock terminal 12 and a reversed second clock pulse CK2 through the second clock terminal 13, i.e., when the first clock pulse CK1 is at the high voltage level, the second clock pulse CK2 is at the low voltage level, and vice versa. The first clock pulse CK1 and the second clock pulse CK2 have the voltage of $V_{DD}$ when at the high voltage level, or zero volt when at the low voltage level.

The transistor set 14 comprises a first transistor $M_1$, a second transistor $M_2$, a third transistor $M_3$, a fourth transistor $M_4$, a fifth transistor $M_5$, a sixth transistor $M_6$, a seventh transistor $M_7$, an eighth transistor $M_8$ and a ninth transistor $M_9$.

The input terminal set 15 comprises a $1^{st}$ input terminal $I_1$, a $2^{nd}$ input terminal $I_2$, a $3^{rd}$ input terminal $I_3$, a $4^{th}$ input terminal $I_4$, a $5^{th}$ input terminal $I_5$, a $6^{th}$ input terminal $I_6$, a $7^{th}$ input terminal $I_7$, an $8^{th}$ input terminal $I_8$, and a $9^{th}$ input terminal $I_9$.

The collectors of the $1^{st}$ through $9^{th}$ transistors $M_1$~$M_9$ of the transistor set 14 of the chip 1 are respectively electrically connected to the respective bases thereof; the junctions between the respective collectors and bases emitters of the $1^{st}$ through $9^{th}$ transistors $M_1$~$M_9$ are respectively electrically connected to the $1^{st}$ through $9^{th}$ input terminals $I_1$~$I_9$; the emitters of the $1^{st}$ through $8^{th}$ transistors $M_2$~$M_8$ are respectively electrically connected to the junctions between the collectors and bases of the $2^{nd}$ through $9^{th}$ transistors $M_2$~$M_9$; the emitter of the $9^{th}$ transistor $M_9$ is electrically connected to the output terminal 16. Further, the $1^{st}$ through $9^{th}$ transistors $M_1$~$M_9$ each have a respective threshold voltage $V_t$.

The package substrate 2 comprises a first clock pin 21, a second clock pin 22, an external pin set 23, and a power output pin 24. The external pin set 23 comprises a $1^{st}$ external pin $O_1$, a $2^{nd}$ external pin $O_2$, a $3^{rd}$ external pin $O_3$, a $4^{th}$ external pin $O_4$, a $5^{th}$ external pin $O_5$, a $6^{th}$ external pin $O_6$, a $7^{th}$ external pin $O_7$, an $8^{th}$ external pin $O_8$, and a $9^{th}$ external pin $O_9$.

Referring to FIG. 2 again, the chip 1 is packaged in the package substrate 2 that is mounted at a circuit board 3 in an electronic apparatus (such as tablet computer, notebook computer, etc.). The circuit board 3 has a $V_{DD}$ input voltage $V_{in}$, a capacitor set 31 and a voltage stabilizer capacitor $C_{ext}$. The capacitor set 31 comprises a $1^{st}$ capacitor $C_1$, a $2^{nd}$ capacitor $C_2$, a $3^{rd}$ capacitor $C_3$, and a $4^{th}$ capacitor $C_4$.

During installation of the first embodiment of the present invention, respectively electrically connect the first clock terminal 12 and second clock terminal 13 of the chip 1 to the first clock pin 21 and second clock pin 22 of the package substrate 2, and then respectively electrically connect the $1^{st}$ through $9^{th}$ input terminals $I_1$~$I_9$ of the chip 1 to the $1^{st}$ through $9^{th}$ external pins $O_1$~$O_9$ of the package substrate 2 while keeping the $1^{st}$ through $4^{th}$ external pins $O_1$~$O_4$ in a floating status without being connected to any components, and then electrically connect the $5^{th}$ external pin $O_5$ to the input voltage $V_{in}$ of the circuit board 3, and then respectively electrically connect the $6^{th}$ through $9^{th}$ external pins $O_6$~$O_9$ of the package substrate 2 to the respective one ends of the $1^{st}$ through $4^{th}$ capacitors $C_1$~$C_4$ of the capacitor set 31, and then electrically and alternatively connect the respective other ends of the $1^{st}$ through $4^{th}$ capacitors $C_1$~$C_4$ of the capacitor set 31 to the first clock pin 21 and second clock pin 22 of the package substrate 2, i.e., electrically connect the odd number capacitors $C_1$ and $C_3$ to the first clock pin 21 and the even number capacitors $C_2$ and $C_4$ to the second clock pin 22, and then electrically connect the power output pin 24 of the package substrate 2 to an internal working circuit 4 of an electronic apparatus and one end of the voltage stabilizer capacitor $C_{ext}$ of the circuit board 3, and then electrically connect the other end of the voltage stabilizer capacitor $C_{ext}$ of the circuit board 3 to ground.

During charging of the $1^{st}$ capacitor $C_1$, the first clock pulse CK1 is at the low voltage level and the second clock pulse CK2 is at the high voltage level, therefore, the $6^{th}$ transistor $M_6$ and $8^{th}$ transistor $M_8$ are electrically disconducted, and the $5^{th}$ transistor $M_5$, $7^{th}$ transistor $M_7$ and $9^{th}$ transistor $M_9$ are electrically conducted. At this time, the $V_{DD}$ input voltage $V_{in}$ is conducted through the $5^{th}$ transistor $M_5$ to generate a threshold voltage $V_t$, and also conducted to one end of the $1^{st}$ capacitor $C_1$ to form a voltage of $(V_{DD}-V_t)$ while the other end of the $1^{st}$ capacitor $C_1$ receives zero volt from the first clock pulse CK1, and thus the $1^{st}$ capacitor $C_1$ is charged to the voltage level of $(V_{DD}-V_t)$.

During boosting of the $1^{st}$ capacitor $C_1$ after the $1^{st}$ capacitor $C_1$ has been charged to the voltage level of $(V_{DD}-V_t)$, the clock pulse CK1 is at the high voltage level and the second clock pulse CK2 is at the low voltage level, therefore, the $5^{th}$ transistor $M_5$, $7^{th}$ transistor $M_7$ and $9^{th}$ transistor $M_9$ are electrically disconducted, and the $6^{th}$ transistor $M_6$ and $8^{th}$ transistor $M_8$ are electrically conducted. At this time, one end of the $1^{st}$ capacitor $C_1$ receives $V_{DD}$ volt from the first clock pulse CK1. Because the $1^{st}$ capacitor $C_1$ has stored therein the voltage of $(V_{DD}-V_t)$, the other end the $1^{st}$ capacitor $C_1$ has a voltage of $(2V_{DD}-V_t)$. Therefore, the voltage of $(2V_{DD}-V_t)$ at the other end the $1^{st}$ capacitor $C_1$ is conducted through the $6^{th}$ transistor $M_6$ to generate a threshold voltage $V_t$, and also conducted to one end of the $2^{nd}$ capacitor $C_2$ to form a voltage of $2\times(V_{DD}-V_t)$ while the other end of the $2^{nd}$ capacitor $C_2$ receives zero volt from the second clock pulse CK2, and thus the $2^{nd}$ capacitor $C_2$ is charged to the voltage level of $2\times(V_{DD}-V_t)$.

Regulation of the voltage of the $3^{rd}$ capacitor $C_3$ and $4^{th}$ capacitor $C_4$ can be achieved subject to the aforesaid procedure, i.e., the storage voltages in the $1^{st}$ capacitor $C_1$, $2^{nd}$ capacitor $C_2$, $3^{rd}$ capacitor $C_3$ and $4^{th}$ capacitor $C_4$ are multiplied to the voltage levels of $(V_{DD}-V_t)$, $2\times(V_{DD}-V_t)$, $3\times(V_{DD}-V_t)$ and $4\times(V_{DD}-V_t)$, and then an output voltage $V_{out}$ at the voltage level of $5\times(V_{DD}-V_t)$ is produced at the power output pin 24 of the package substrate 2 and then stabilized through the voltage stabilizer capacitor $C_{ext}$ and then outputted to the working circuit 4 for working.

Figure 3:
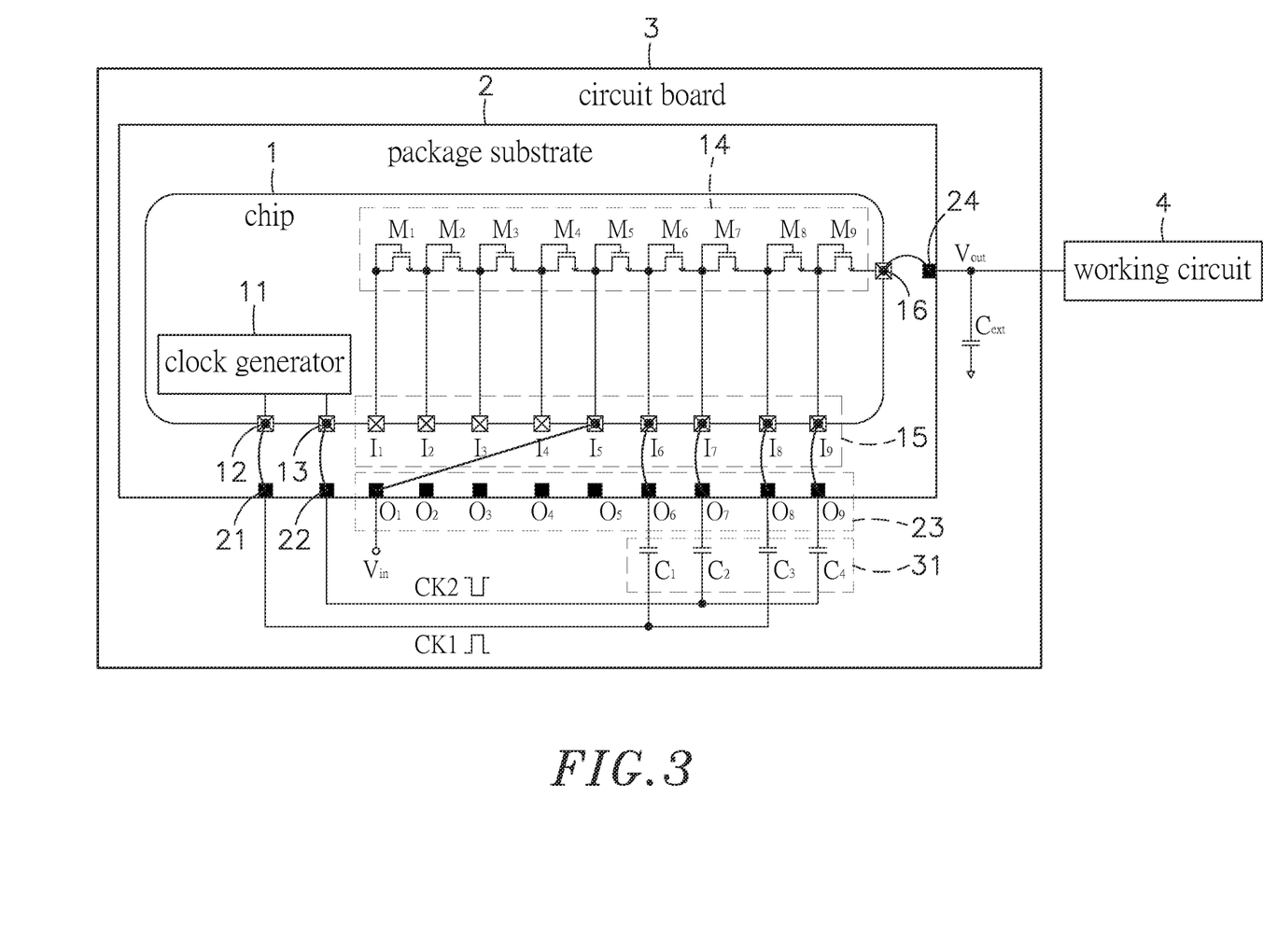
FIG. 3 is a schematic drawing illustrating an applied status of a charge pump in accordance with a second embodiment of the present invention.

FIG. 3 illustrates a second embodiment of the present invention. In this embodiment, the $1^{st}$ through $4^{th}$ input terminals $I_1 \sim I_4$ of the chip 1 are respectively cut off from the $1^{st}$ through $4^{th}$ external pins $O_1 \sim O_4$ of the package substrate 2, the $5^{th}$ input terminal $I_5$ is electrically connected to the $1^{st}$ external pin $O_1$ of the package substrate 2, and the $1^{st}$ external pin $O_1$ is electrically connected to the input voltage $V_{in}$ of the circuit board 3.

From the above-described first and second embodiment, it can be known that the chip 1 and the package substrate 2 are applied to a circuit board 3, enabling the voltage at the capacitor set 31 of the circuit board 3 to be continuously boosted, and thus, the input voltage $V_{in}$ is amplified for generating an output voltage $V_{out}$, and further, controlling the internal transistor set 14 of the chip 1 to match with the capacitor set 31 of the circuit board 3 can regulate the output voltage $V_{out}$. Thus, if the desired output voltage $V_{out}$ is a predetermined number of times $(Y+1)$ of $(V_{DD}-V_t)$, i.e., the output voltage $V_{out}$ is $(Y+1)\times(V_{DD}-V_t)$, it can be achieved in the manner described hereinafter.

Figure 4:
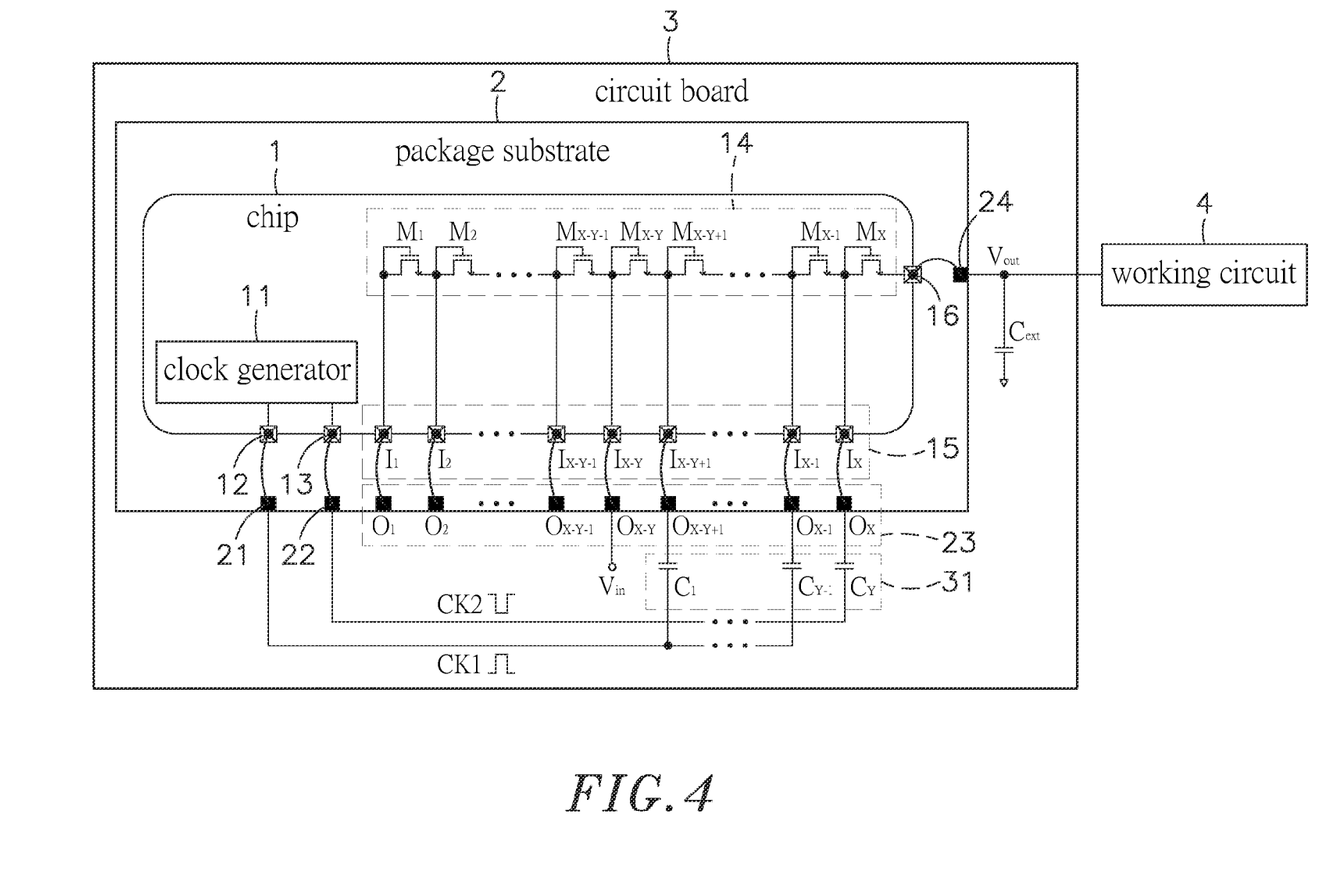
FIG. 4 is a schematic circuit diagram of the first embodiment of the charge pump in accordance with the present invention.

Referring to FIG. 4, the transistor set 14 and input terminal set 15 of the chip 1 have X transistors and X input terminals respectively, wherein $X \geq 3$; the junctions between the collectors and bases of the $1^{st}$ through $X^{th}$ transistors $M_1 \sim M_x$ are respectively electrically connected to the $1^{st}$ through $X^{th}$ input terminals $I_1 \sim I_x$ (i.e., the junction between the collector and base of the $1^{st}$ transistor $M_1$ is electrically connected to the $1^{st}$ input terminal $I_1$, the junction between the collector and base of the $2^{nd}$ transistor $M_2$ is electrically connected to the $2^{nd}$ input terminal $I_2$, and so on, till that the junction between the collector and base of the $X^{th}$ transistor $M_x$ is electrically connected to the $X^{th}$ input terminal $I_x$); the emitters of the $1^{st}$ through $(X-1)^{th}$ transistors $M_1 \sim M_{x-1}$ are respectively electrically connected to the junctions between the collectors and bases of the $2^{nd}$ through $X^{th}$ transistors $M_2 \sim M_x$; the emitter of the X transistor $M_x$ is electrically connected to the output terminal 16; the external pin set 23 of the package substrate 2 comprises X external pins (i.e., $1^{st}$ external pin $O_1$, $2^{nd}$ external pin $O_2$ through $X^{th}$ external pin $O_x$); the capacitor set 31 of the circuit board 3 comprises Y capacitors C (i.e., $1^{st}$ capacitor $C_1$, $2^{nd}$ capacitor $C_2$ through $Y^{th}$ capacitor $C_Y$), where $Y<X$.

In actual application, the $1^{st}$ through $X^{th}$ input terminals $I_1 \sim I_x$ of the chip 1 are respectively electrically connected to the $1^{st}$ through $X^{th}$ external pins $O_1 \sim O_x$ of the external pin set 23 of the package substrate 2; the $1^{st}$ through $(X-Y-1)^{th}$ external pins $O_1 \sim O_{X-Y-1}$ of the external pin set 23 are floating; the $(X-Y)^{th}$ external pin $O_{X-Y}$ is electrically connected to the input voltage $V_{in}$ of the circuit board 3; the $(X-Y+1)^{th}$ through $X^{th}$ external pins $O_{X-Y+1} \sim O_x$ of the external pin set 23 of the package substrate 2 are respectively electrically connected to the respective one ends of the $1^{st}$ through $Y^{th}$ capacitors $C_1 \sim C_Y$ of the circuit board 3; the respective one ends of the $1^{st}$ through $Y^{th}$ capacitors $C_1 \sim C_Y$ of the circuit board 3 are respectively alternatively connected to the first clock pin 21 and the second clock pin 22, i.e., the odd number capacitors $C_1$, $C_3$ and etc. are electrically connected to the first clock pin 21, and the even number capacitors $C_2$, $C_4$ and etc. are electrically connected to the second clock pin 22.

In this first embodiment, the voltages at the $1^{st}$ capacitor $C_1$, $2^{nd}$ capacitor $C_2$ through $Y^{th}$ capacitor $C_Y$ are respectively multiplied to the storage voltages of $V_{DD}-V_t$, $2\times(V_{DD}-V_t)$ and $Y\times(V_{DD}-V_t)$, enabling the power output pin 24 of the package substrate 2 to obtain $(Y+1)\times(V_{DD}-V_t)$ output voltage $V_{out}$.

In the first embodiment, 9 transistors $(X=9)$ are used with 4 capacitors $(Y=4)$ to obtain $5\times(V_{DD}-V_t)$ output voltage $V_{out}$ $(Y+1=5)$. Alternatively 9 transistors $(X=9)$ are used with 6 capacitors $(Y=6)$ to obtain $7\times(V_{DD}-V_t)$ output voltage $V_{out}$ $(Y+1=7)$. Thus, the output voltage $V_{out}$ can be regulated subject to the desired voltage for the working circuit 4, i.e. any desired output voltage $V_{out}$ can be provided without changing the circuit design of the chip 1.

Figure 5:
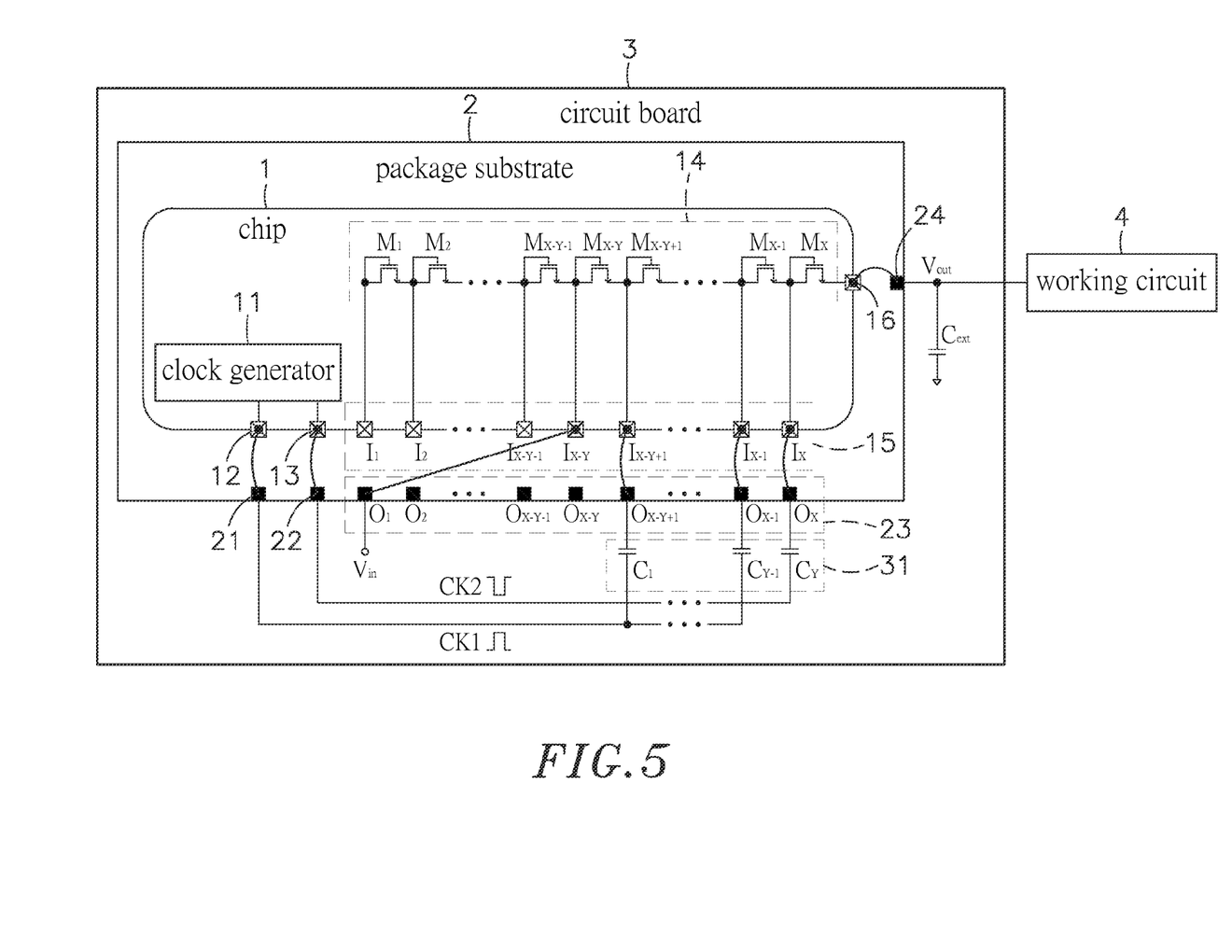
FIG. 5 is a schematic circuit diagram of the second embodiment of the charge pump in accordance with the present invention.

Further, in a second embodiment of the present invention shown in FIG. 5, the $1^{st}$ through $(X-Y-1)^{th}$ input terminals $I_1 \sim I_{X-Y-1}$ of the chip 1 are cut off from the $1^{st}$ through $(X-Y-1)^{th}$ external pins $O_1 \sim O_{X-Y-1}$ of the external pin set 23 of the package substrate 2, the X-Y input terminal $I_{X-Y}$ of the chip 1 is electrically connected to the $1^{st}$ external pin $O_1$ of the external pin set 23 of the package substrate 2, and the $1^{st}$ external pin $O_1$ is then electrically connected to the input voltage $V_{in}$ of the circuit board 3.

In the above-described first embodiment, the $1^{st}$ through $X^{th}$ input terminals $I_1 \sim I_X$ of the chip 1 are respectively electrically connected to the $1^{st}$ through $X^{th}$ external pins $O_1 \sim O_x$ of the external pin set 23 of the package substrate 2, and the $1^{st}$ through $(X-Y-1)^{th}$ external pins $O_1 \sim O_{X-Y-1}$ of the external pin set 23 are floating; in the above-described second embodiment, the $1^{st}$ through $(X-Y-1)^{th}$ input terminals $I_1 \sim I_{X-Y-1}$ of the chip 1 are cut off from the $1^{st}$ through $(X-Y-1)^{th}$ external pins $O_1 \sim O_{X-Y-1}$ of the external pin set 23 of the package substrate 2, and the X-Y input terminal $I_{X-Y}$ of the chip 1 is electrically connected to the $1^{st}$ external pin $O_1$ of the external pin set 23 of the package substrate 2. However, in actual application, the $(X-Y)^{th}$ input terminal $I_{X-Y}$ of the chip 1 can be electrically connected to any external pin among the $1^{st}$ through $(X-Y)^{th}$ external pins $O_1\sim O_{X-Y}$ of the external pin set 23 subject to the working voltage of the working circuit 4, and then electrically connect the external pin of the package substrate 2 that is electrically connected to the $(X-Y)^{th}$ input terminal $I_{X-Y}$ of the chip 1 to the input voltage $V_{in}$ of the circuit board 3. For example, connect the $(X-Y)^{th}$ input terminal $I_{X-Y}$ of the chip 1 to the $(X-Y-1)$ external pin $O_{X-Y-1}$ of the external pin set 23 of the package substrate 2, and then connect the $(X-Y-1)$ external pin $O_{X-Y-1}$ to the input voltage $V_{in}$ of the circuit board 3, and at this time, a threshold Vt voltage drop, i.e., $(Y+1) \times V_{DD} - Y_x V_t$ is presented at the output voltage $V_{out}$, thus, through multiple transistors' threshold Vt voltage drop during charging of the capacitors $C_1 \sim C_Y$ of the capacitor set 31 of the circuit board 3, the output voltage is adjusted to the desired voltage level for the working circuit 4.

Figure 6:
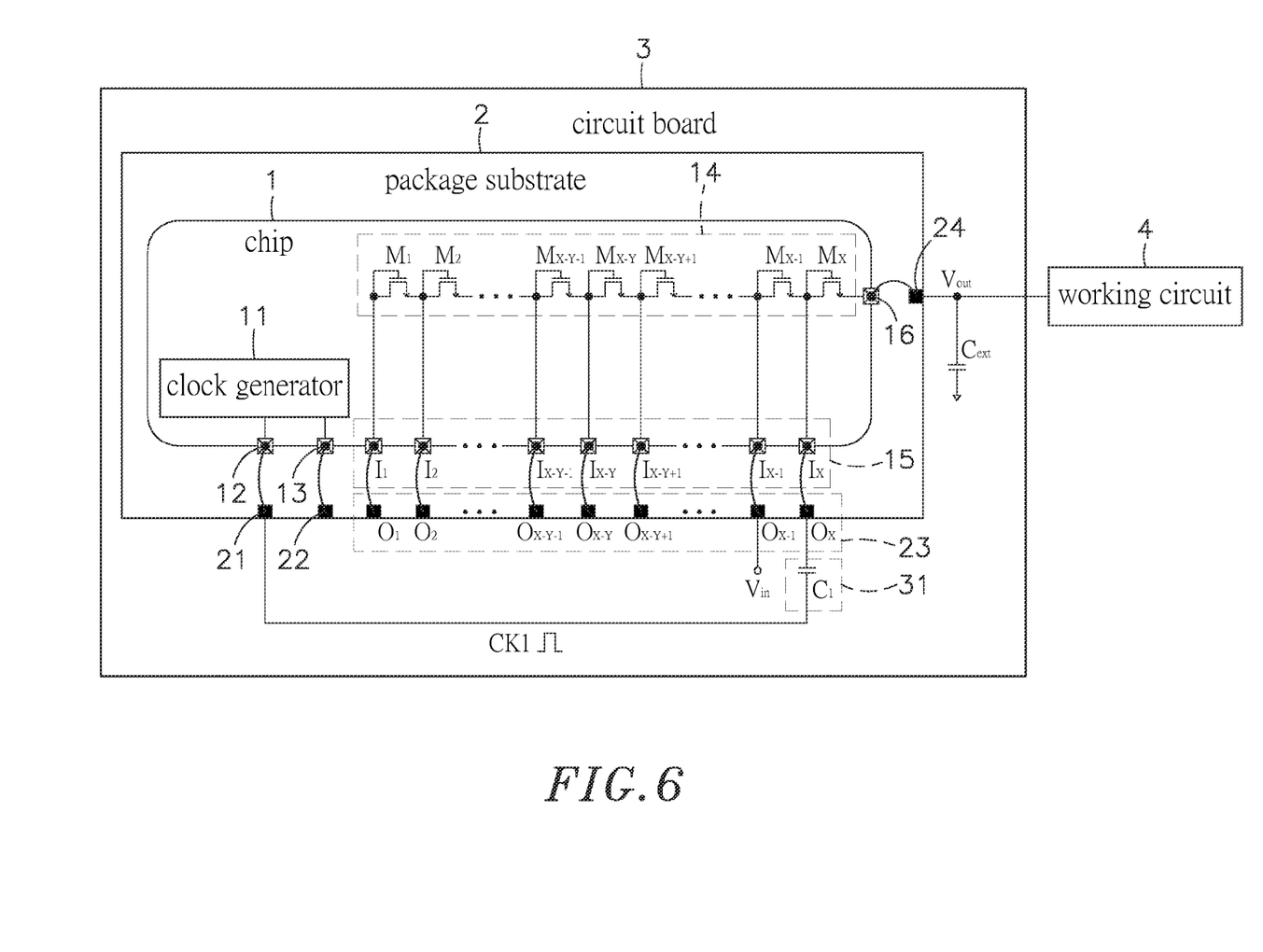
FIG. 6 is a schematic circuit diagram illustrating another alternate form of the charge pump in accordance with the present invention.

Referring to FIG. 6, in another alternate form of the present invention, the capacitor set 31 of the circuit board 3 simply comprises one capacitor, namely, the $1^{st}$ capacitor $C_1$, the first clock pin 21 of the package substrate 2 is electrically connected to one end of the $1^{st}$ capacitor $C_1$, the other end of the $1^{st}$ capacitor $C_1$ is electrically connected to the $X^{th}$ external pin $O_x$; the $1^{st}$ through $(X-1)^{th}$ external pins $O_1 \sim O_{x-1}$ are respectively electrically connected to the $1^{st}$ through $(X-1)^{th}$ input terminals $I_1 \sim I_{x-1}$; the $(X-1)^{th}$ external pin $O_{x-1}$ is electrically connected to the input voltage $V_{in}$. Thus, when the first clock pulse CK1 is at the low voltage level, the $X^{th}$ transistor $M_x$ is cut off, the $(X-1)^{th}$ transistor $M_{x-1}$ is electrically conducted. At this time, the $V_{DD}$ input voltage $V_{in}$ is transmitted through the $(X-1)^{th}$ transistor $M_{x-1}$ to produce a threshold Vt voltage drop, and a voltage of $V_{DD}-V_t$ is presented at one end of the $1^{st}$ capacitor $C_1$, and thus, the $1^{st}$ capacitor $C_1$ is charged to the voltage level of $V_{DD}-V_t$. During boosting of the $1^{st}$ capacitor $C_1$ after the $1^{st}$ capacitor $C_1$ has been charged to $V_{DD}-V_t$, the first clock pulse CK1 is at the high voltage level, and therefore, the $(X-1)^{th}$ transistor $M_{x-1}$ is cut off, and the $X^{th}$ transistor $M_x$ is electrically conducted. At this time, one end of the $1^{st}$ capacitor $C_1$ receives the $V_{DD}$ volt from the first clock pulse CK1, however, because the $1^{st}$ capacitor $C_1$ has $V_{DD}-V_t$ stored therein, $2 \times (V_{DD}-V_t)$ is presented at the other end of the $1^{st}$ capacitor $C_1$ and transmitted through the $X^{th}$ transistor $M_x$ to produce a threshold $V_t$ voltage drop, and thus, $2 \times (V_{DD}-V_t)$ output voltage $V_{out}$ is produced and stabilized by the voltage stabilizer capacitor $C_{ext}$ and outputted to the working circuit 4 of the electronic apparatus for working.

Further, from the above-described second embodiment of the present invention, it can be known that the $1^{st}$ through $(X-2)^{th}$ input terminals $I_1 \sim I_{x-2}$ of the chip 1 can be respectively electrically connected to the $1^{st}$ through $(X-2)^{th}$ external pins $O_1 \sim O_{x-2}$ of the package substrate 2, and the $(X-1)^{th}$ input terminals $I_{x-1}$ of the chip 1 can be electrically connected to the $1^{st}$ external pin $O_1$ of the package substrate 2, and the $1^{st}$ external pin $O_1$ of the package substrate 2 can then be electrically connected to the input voltage $V_{in}$ of the circuit board 3, and thus, one of the $1^{st}$ through $(X-1)^{th}$ external pins $O_1 \sim O_{x-1}$ of the package substrate 2 can be electrically connected to the $(X-1)^{th}$ input terminals $I_{x-1}$ of the chip 1 and the input voltage $V_{in}$ of the circuit board 3.

In short, in one embodiment of the present invention, the (X-Y) input terminal $I_{X-Y}$ of the chip 1 is electrically connected to the $(X-Y)^{th}$ external pin $O_{X-Y}$ of the package substrate 2 and also electrically connected to the input voltage $V_{in}$ of the circuit board 3; in another embodiment of the present invention, the (X-Y) input terminal $I_{X-Y}$ of the chip 1 is electrically connected to the 1sr external pin $O_1$ of the package substrate 2, and then the $1^{st}$ external pin $O_1$ of the package substrate 2 is electrically connected to the input voltage $V_{in}$ of the circuit board 3. Thus, one end of one of the $1^{st}$ through $(X-Y)^{th}$ external pins $O_1 \sim O_{X-Y}$ of the package substrate 2 is electrically connected to one end of the $(X-Y)^{th}$ input terminal $I_{X-Y}$ of the chip 1 and then the other end of the said external pin is electrically connected to the input voltage $V_{in}$ of the circuit board 3, and the $(X-Y+1)^{th}$ through $X^{th}$ external pins $O_{X-Y+1} \sim O_x$ of the package substrate 2 are respectively electrically connected to the $1^{st}$ through $Y^{th}$ capacitors $C_1 \sim C_Y$ of the capacitor set 31 of the circuit board 3. And thus, by means of electrically conducting or cutting off the $(X-Y)^{th}$ through $X^{th}$ transistors $M_{X-Y} \sim M_X$, the input voltage $V_{in}$ of the circuit board 3 can be boosted to provide an output voltage $V_{out}$ of $(Y+1) \times (V_{DD}-V_t)$ volts. When the input voltage $V_{in}$ is being boosted through the $1^{st}$ through $Y^{th}$ capacitors $C_1 \sim C_Y$ of the capacitor set 31 of the circuit board 3, it is free from the action of the $1^{st}$ through $(X-Y-1)^{th}$ transistors $M_1 \sim M_{X-Y-1}$, and therefore the original design of the $1^{st}$ through $(X-Y-1)^{th}$ transistors $M_1 \sim M_{X-Y-1}$ can be maintained without causing any change in the output voltage $V_{out}$. Therefore, the invention eliminates the problem of the prior art design that needs to change the internal circuit design when a different output voltage $V_{out}$ is required.

In the first embodiment of the present invention, the circuit layout between the chip 1 and the package substrate 2 is fixed, i.e., the $1^{st}$ through $X^{th}$ input terminals $I_1 \sim I_x$ of the chip 1 are respectively electrically connected to the $1^{st}$ through $X^{th}$ external pins $O_1 \sim O_x$ of the package substrate 2, and the $1^{st}$ through $(X-Y-1)^{th}$ external pins $O_1 \sim O_{X-Y-1}$ are kept in a floating status without being connected to any components. Thus, by means of changing the layout of and the $(X-Y)^{th}$ through $X^{th}$ external pins $O_{X-Y} \sim O_x$, a different output voltage $V_{out}$ can be obtained without changing the circuit layout of the package substrate 2. Therefore, for allowing the charge pump to be used in any of a variety of electronic apparatuses to match with a predetermined working circuit 4, the chip 1 and the package substrate 2 simply need to be verified once, eliminating further verification procedure and saving much the cost.

In the second embodiment of the present invention, the circuit layout of the chip 1 is fixed, the $(X-Y)^{th}$ input terminal $I_{X-1}$ of the chip 1 is electrically connected to the $1^{st}$ external pin $O_1$ of the package substrate 2, and the $1^{st}$ external pin $O_1$ is then electrically connected to the input voltage $V_{in}$ of the circuit board 3, thus, the wiring of the package substrate 2 can be changed to match the circuit layout of the circuit board 3, enabling the circuit board 3 to generate the desired output voltage $V_{out}$ for the working of the working circuit 4 of a predetermined electronic apparatus without changing the input voltage $V_{in}$ or the circuit layout of the $1^{st}$ through $Y^{th}$ capacitors $C_1 \sim C_Y$.

In conclusion, the invention provides a charge pump, which comprises a chip 1 and a package substrate 2, wherein one end of the $1^{st}$ through $(X-Y)^{th}$ external pins $O_1 \sim O_{X-Y}$ of the package substrate 2 is electrically connected to the $(X-Y)^{th}$ input terminal $I_{X-Y}$ of the chip 1, and the other end of the said external pin is electrically connected to the input voltage $V_{in}$ of the circuit board 3, and thus, when the input voltage $V_{in}$ is being boosted through the $1^{st}$ through $Y^{th}$ capacitors $C_1 \sim C_Y$ of the capacitor set 31 of the circuit board 3, it is free from the action of the $1^{st}$ through $(X-Y-1)^{th}$ transistors $M_1 \sim M_{X-Y-1}$, and therefore the original design of the $1^{st}$ through $(X-Y-1)^{th}$ transistors $M_1 \sim M_{X-Y-1}$ can be maintained without causing any change in the output voltage $V_{out}$.

Therefore, the invention eliminates the problem of the prior art design that needs to change the internal circuit design when a different output voltage $V_{out}$ is required.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A charge pump, comprising a chip and a package substrate packaged on said chip and installed in a circuit board comprising an input voltage, a capacitor set comprising a plurality of capacitors numbered from $1^{st}$ through $Y^{th}$, and a voltage stabilizer capacitor, the $1^{st}$ through $Y^{th}$ capacitors of said circuit board being adapted for storing and boosting said input voltage to provide an output voltage, wherein said chip comprises:
a clock generator for generating a first clock pulse and a reversed second clock pulse;
a first clock terminal electrically connected to said clock generator for receiving said first clock pulse;
a second clock terminal electrically connected to said clock generator for receiving said second clock pulse;
a transistor set comprising X number of transistors numbered $1^{st} \sim X^{th}$, said X number being ≥3, the collectors of the $1^{st} \sim X^{th}$ transistors being respectively electrically connected to the respective bases thereof, the emitters of the $1^{st} \sim (X-1)^{th}$ transistors being respectively electrically connected to the junctions between the collectors and bases of the $2^{nd} \sim X^{th}$ transistors;
an input terminal set comprising X number of input terminals numbered from $1^{st} \sim X^{th}$ and respectively electrically connected to the junctions between the collectors and bases of the $1^{st} \sim X^{th}$ transistors; and
an output terminal electrically connected to the emitter of the $X^{th}$ transistor;

said package substrate comprises:
a first clock pin electrically connected to said first clock terminal and electrically connected to respective one ends of odd number capacitors of said circuit board;
a second clock pin electrically connected to said second clock terminal and electrically connected to respective one ends of even number capacitors of said circuit board;
an external pin set comprising X number external pins numbered from $1^{st} \sim X^{th}$, one of the $1^{st} \sim (X-Y)^{th}$ external pins being electrically connected to the $(X-Y)^{th}$ input terminal and said input voltage, the $(X-Y+1)^{th} \sim X^{th}$ external pins being respectively electrically connected to the $1^{st} \sim Y^{th}$ capacitors; and
a power output pin electrically connected to said output terminal of said chip and also electrically connected to one end of said voltage stabilizer capacitor.

2. The charge pump as claimed in claim 1, wherein the $(X-Y)^{th}$ input terminal of said chip is electrically connected to the $(X-Y)^{th}$ external pin of said package substrate.

3. The charge pump as claimed in claim 1, wherein the $(X-Y)^{th}$ input terminal of said chip is electrically connected to the first external pin of said package substrate.

4. The charge pump as claimed in claim 1, wherein the $1^{st} \sim (X-Y)^{th}$ input terminals of said chip are respectively electrically connected the $1^{st} \sim (X-Y)^{th}$ external pins of said package substrate, and the $1^{st} \sim (X-Y-1)^{th}$ external pins of said package substrate are in a floating status.

5. A charge pump, comprising a chip and a package substrate packaged on said chip and installed in a circuit board comprising an input voltage, a capacitor set comprising a plurality of capacitors, and a voltage stabilizer capacitor having one end thereof grounded, said capacitor set comprising a first capacitor for storing and boosting said input voltage to provide an output voltage, wherein said chip comprises:
a clock generator for generating a first clock pulse;
a first clock terminal electrically connected to said clock generator for receiving said first clock pulse;
a transistor set comprising X number of transistors numbered $1^{st} \sim X^{th}$, said X number being ≥3>Y, the collectors of the $1^{st} \sim X^{th}$ transistors being respectively electrically connected to the respective bases thereof, the emitters of the $1^{st} \sim (X-1)^{th}$ transistors being respectively electrically connected to the junctions between the collectors and bases of the $2^{nd} \sim X^{th}$ transistors;
an input terminal set comprising X number of input terminals numbered from $1^{st} \sim X^{th}$ and respectively electrically connected to the junctions between the collectors and bases of the $1^{st} \sim X^{th}$ transistors; and
an output terminal electrically connected to the emitter of the $X^{th}$ transistor;

said package substrate comprises:
a first clock pin electrically connected to said first clock terminal and electrically connected to one end of the first capacitor of said circuit board;
an external pin set comprising X number external pins numbered from $1^{st} \sim X^{th}$, one of the $1^{st} \sim (X-1)^{th}$ external pins being electrically connected to the $(X-1)^{th}$ input terminal and said input voltage, the $X^{th}$ external pin being electrically connected to an opposite end of the first capacitor; and
a power output pin electrically connected to said output terminal of said chip and also electrically connected to an opposite end of said voltage stabilizer capacitor.

6. The charge pump as claimed in claim 5, wherein the $(X-1)^{th}$ input terminal of said chip is electrically connected to the $(X-1)^{th}$ external pin of said package substrate.

7. The charge pump as claimed in claim 5, wherein the $(X-1)^{th}$ input terminal of said chip is electrically connected to the first external pin of said package substrate.

8. The charge pump as claimed in claim 5, wherein the $1^{st} \sim (X-1)^{th}$ input terminals of said chip are respectively electrically connected the $1^{st} \sim (X-1)^{th}$ external pins of said package substrate, and the $1^{st} \sim (X-2)^{th}$ external pins of said package substrate are in a floating status.

* * * * *